(12) United States Patent
Blank (10) Patent No.: US 10,366,318 B2
(45) Date of Patent: Jul. 30, 2019

(54) MICRO RFID TAG WITH CONDUCTIVE INTERFACE

(71) Applicant: Brian K. Blank, Cortland, OH (US)

(72) Inventor: Brian K. Blank, Cortland, OH (US)

( * ) Notice: Subject to any disclaimer, the term of this patent is extended or adjusted under 35 U.S.C. 154(b) by 0 days.

(21) Appl. No.: 16/222,218

(22) Filed: Dec. 17, 2018

(65) Prior Publication Data

US 2019/0197380 A1   Jun. 27, 2019

Related U.S. Application Data

(60) Provisional application No. 62/609,820, filed on Dec. 22, 2017.

(51) Int. Cl.
*G06K 19/077* (2006.01)

(52) U.S. Cl.
CPC . *G06K 19/07722* (2013.01); *G06K 19/07773* (2013.01)

(58) Field of Classification Search
USPC .......................................... 235/488
See application file for complete search history.

(56) References Cited

U.S. PATENT DOCUMENTS

| | | | |
|---|---|---|---|
| 6,268,796 B1 * | 7/2001 | Gnadinger | G06K 19/0726 257/673 |
| 7,432,816 B1 | 10/2008 | Ku et al. | |
| 2008/0062044 A1 | 3/2008 | Al-Mahdawi | |
| 2010/0079286 A1 | 4/2010 | Phaneuf | |
| 2010/0201487 A1 | 8/2010 | Halberthal et al. | |
| 2014/0062825 A1 | 3/2014 | Hansen et al. | |
| 2014/0209691 A1 * | 7/2014 | Finn | G06K 19/07769 235/492 |
| 2014/0320376 A1 * | 10/2014 | Ozdemir | H01Q 9/0442 343/876 |
| 2015/0091725 A1 | 4/2015 | Rigsby et al. | |
| 2015/0272690 A1 | 10/2015 | Deng et al. | |
| 2016/0346045 A1 * | 12/2016 | Sterrett | A61B 18/1492 |
| 2017/0185884 A1 | 6/2017 | Lynch et al. | |

OTHER PUBLICATIONS

Omnexus, A Complete Guide to Polycarbonate (PC), https://omnexus.specialchem.com/selection-guide/polycarbonate-pc-plastic, SpecialChem (Year: 2014).*

* cited by examiner

*Primary Examiner* — Michael G Lee
*Assistant Examiner* — David Tardif
(74) *Attorney, Agent, or Firm* — Dureska & Moore, LLC; Brent L. Moore; Benjamin J. Chojnacki (57) ABSTRACT

A micro radio frequency identification tag for use on articles in an equipment identification and tracking system includes a substrate, an RFID chip, a power storage means, an antenna, and a conductive means. The substrate has a pair of surfaces. The RFID chip and power storage means are operatively retained on one surface. The antenna is operatively retained on the other surface of the substrate and acts as a conductive layer. The conductive means extends between the surfaces of the substrate to operatively connect the antenna to the RFID chip and power storage means.

18 Claims, 8 Drawing Sheets

MICRO RFID TAG WITH CONDUCTIVE INTERFACE

CROSS-REFERENCE TO RELATED APPLICATION

This application claims the benefit of U.S. Provisional Patent Application Ser. No. 62/609,820, filed Dec. 22, 2017.

BACKGROUND OF THE INVENTION

Field of the Invention

The subject disclosure relates generally to equipment identification and equipment tracking systems. More particularly, the subject disclosure relates to a system for identifying and tracking medical or industrial articles and/or equipment that are exposed to or utilized in extreme environmental conditions. More specifically, the subject disclosure relates to a micro radio frequency identification tag assembly that includes a conductive interface which is operatively mounted to a surgical instrument for identifying and tracking the surgical instrument prior to and following use in the operating room.

Background Art

Identification and tracking of articles and other equipment is generally well known. In particular, identification and tracking of articles, such as industrial equipment and tools or surgical instruments, has been utilized to ensure proper maintenance and use-life schedule as well as to monitor the physical location of the articles. Typically, the process of identification and tracking is accomplished through manual record keeping, visual inspection, and processing of the articles or instruments. More particularly, identification of the articles is typically provided through visual marking, such as mechanical etching or color-coded films or bands, which allow for non-specific identification of the article. However, because the articles may be grouped together indiscriminately for processing, identification and tracking, using visual markings lacks specificity and requires an increased amount of time for workers to accomplish.

In order to increase the specificity and speed of identification and tracking, electronic identification technology has been developed to provide unique tracking of certain articles. In particular, radio frequency identification ("RFID") systems have been adapted for identification and tracking of various assets and articles and are generally well known. RFID systems typically use reusable RFID tags mounted on, or embedded in, an article to be tracked. These mounted RFID tags allow for tracking of the article through gathering processes, use, and maintenance.

Prior art RFID tags are generally formed on a substrate and include an integrated circuit with memory and logic components. Prior art RFID tags may also include other components, such as a power sources, transistors, diodes, and transmission mechanisms. Typically, the memory component interacts with the logic component, allowing the storage of data, typically identification information, such as an identification number, that corresponds to the article on which the RFID tag is mounted. The memory component may also allow new or additional information to be stored or, together with the logic component, may allow the RFID tag to manipulate data or perform additional functions. Other components, such as a capacitor or power source provide electrical energy for the logic and memory components to operate. Other components, such as transmission mechanisms or antennas, allow data to be transmitted between the RFID tag and a radio frequency reader or field generator. The memory, logic, and other components are typically formed in or mounted on the substrate. The assembled RFID tag including the memory, logic, and other components may then be encapsulated in some material for protection.

Prior art RFID tags typically operate by either active or passive means. Active RFID tags generally have a discrete power source, such as a battery. The battery is activated, or turned on, by an external means, such as a radio frequency ("RF") field produced by an RF reader or field generator, allowing the battery to power the logic and memory components. Passive RFID tags are typically inductively or capacitively energized and activated by external means. In particular, passive RFID tags require energization by an RF field. Inductive RFID tags typically have a metal wire wound into a coil acting as an antenna. The antenna creates an induction charge in the presence of the electromagnetic energy of the RF field. The induction charge, in turn, powers the logic and memory components. Capacitive RFID tags have a conductive ink applied to a silicon substrate acting as an antenna. The conductive ink on the silicon substrate has a similar effect as in an inductive RFID tag when exposed to an electromagnetic wave generated by the RF reader or field generator. When exposed to an RF field, both active and passive RFID tags are activated and modulate the RF field to transmit data back to the RF reader. In particular, the logic component executes all data functions, such as retrieving stored data from the memory component and transmitting the retrieved data. Thus, prior art RFID tags provide a means of remotely accessing and retrieving information encoded therein relevant to the articles to be tracked for effective identification, monitoring, and control of the article through industrial processes, use, and maintenance.

Prior art RFID tags, while satisfactory for their intended functions, have disadvantages, drawbacks, and limitations. For example, the read range, or the distance from which a prior art passive RFID tag can be read, is relatively low, requiring an RF reader to be in close proximity to the RFID tag in order to retrieve the data. This reduces the efficiency and speed with which a large number of articles fitted with RFID tags can be identified and tracked through typical industrial and/or medical processes and use. Moreover, prior art RFID tags must also be smaller and shaped to compliment the contour of the article in order to prevent interference with use of the article to which the RFID tag is mounted. Smaller prior art RFID tags have shorter antennae lengths, resulting in a lower transmitted signal gain, which reduces the read range of the prior art RFID tags. As a result, prior art RFID tags are only readable at very close distances, usually in the range of from about 6 in. (152.4 mm) to 12 in (304.8 mm). To extend the read range, prior art RFID tags often have increased antenna lengths. However, increasing antenna length undesirably increases the overall size and adversely changes the shape of the prior art RFID tag.

Alternatively, prior art RFID tags may increase the available charge to the logic component. This, in turn, may increase the transmission signal output power, thereby increasing the read range. However, increasing the available charge in prior art RFID tags generally requires additional components, such as a supplementary power supply or batteries, which increase the size and weight of the prior art RFID tags. Mounting of such large prior art RFID tags to delicate articles may be difficult and/or require placement of the RFID tag on the article in a manner that causes the RFID tag to obstruct or interfere with the normal operation of the article or predisposes the RFID tag to damage or incidental removal during industrial processes, use, sterilization, or maintenance.

The present invention overcomes the disadvantages, drawbacks, and limitations of prior art RFID tags by providing a micro RFID tag with a conductive surface that contacts the surface of an article to which the micro RFID tag is mounted. More specifically, the micro RFID tag of the subject disclosure has a substrate with an antenna acting as a conductive surface which is in contact with the surface of the article to which the micro RFID tag is mounted. The antenna acting as a conductive surface effectively extends the operating length of the antenna of the micro RFID tag, which increases the read range. In addition, the micro RFID tag includes additional capacitors operatively connected to the antenna and a logic means to provide greater charge to the antenna and the logic means, increasing output power and read range of the micro RFID tag. An encapsulation layer disposed around at least a portion of the micro RFID tag provides the micro RFID tag of the subject disclosure with protection from chemicals, impacts, and extreme temperatures. As a result, the overall size and weight of the micro RFID tag of the subject disclosure is elongated and relatively small in width and height, allowing for increased read range and easier mounting on the article without obstructing the normal operation of the article.

SUMMARY OF THE INVENTION

Objectives of the subject disclosure include providing a micro RFID tag with a conductive surface to provide increased read range of the micro RFID tag.

A further objective of the subject disclosure is to provide a micro RFID tag with a conductive surface to provide increased available charge, output power, and read range of the RFID tag.

Yet another objective of the subject disclosure is to provide a micro RFID tag with a conductive interface that is easier to mount to the article without increasing the size and weight of the micro RFID tag or obstructing the normal operation of the article.

Still another objective of the subject disclosure is to provide a micro RFID tag with a conductive interface that is capable of withstanding impacts, chemical exposure, and extreme temperatures which the tag may be exposed to during industrial processes, use, and maintenance of the article to which it is attached.

These objectives and advantages are obtained by the micro RFID tag for use on an article in an equipment identification and tracking system of the subject disclosure including a substrate, an RFID chip, a power storage means, an antenna, and a conductive means. The substrate has a surface onto which the RFID chip and power storage means are operatively retained. The substrate has another surface on which the antenna is operatively retained. The antenna also acts as a conductive layer. The conductive means extends between the surfaces and operatively connects the antenna to the RFID chip and power storage means.

These objectives and advantages are also obtained by the method of utilizing a micro radio frequency identification tag with an article in an equipment identification and tracking system, including the method steps of: 1) providing an RFID tag, the RFID tag including a substrate, an RFID chip, a power storage means, and an antenna operatively retained on the substrate, the antenna also acting as a conductive layer; a conductive means to operatively connect the antenna to the RFID chip and the power storage means, 2) encapsulating at least a portion of the RFID tag with an encapsulant, 3) adhering the non-encapsulated conductive layer of the RFID tag to an article to be identified and tracked.

BRIEF DESCRIPTION OF THE SEVERAL VIEWS OF THE DRAWINGS

The following description and drawings set forth certain illustrative aspects and implementations of the subject disclosure. The drawings are indicative of but a few of the various ways in which one or more aspects or implementations may be employed. Further features of the subject disclosure will become apparent from reading the following description with references to the accompanying drawings in which.

DESCRIPTION OF THE PREFERRED EMBODIMENT

Figure 1:
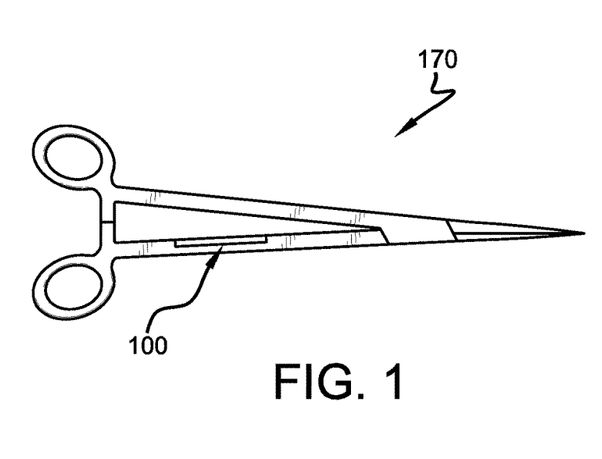
FIG. 1 is a top view of an article having a first exemplary embodiment micro RFID tag, according to the subject disclosure, mounted thereon.
Figure 2:
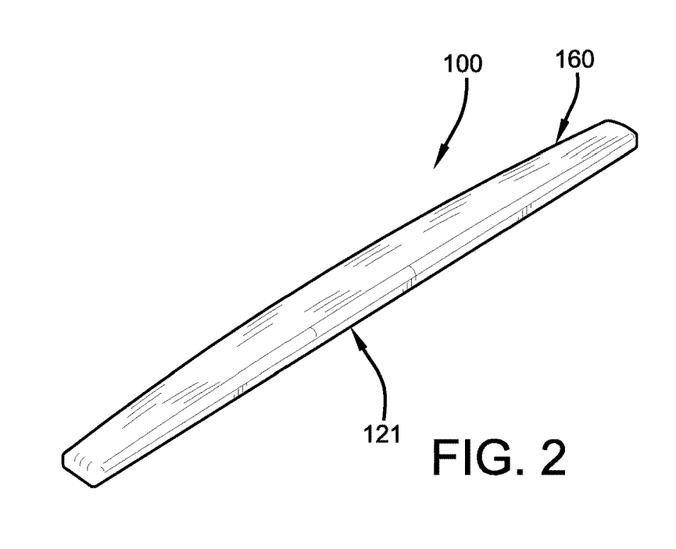
FIG. 2 is a perspective view of the first exemplary embodiment micro RFID tag, according to the subject disclosure.
Figure 2A:
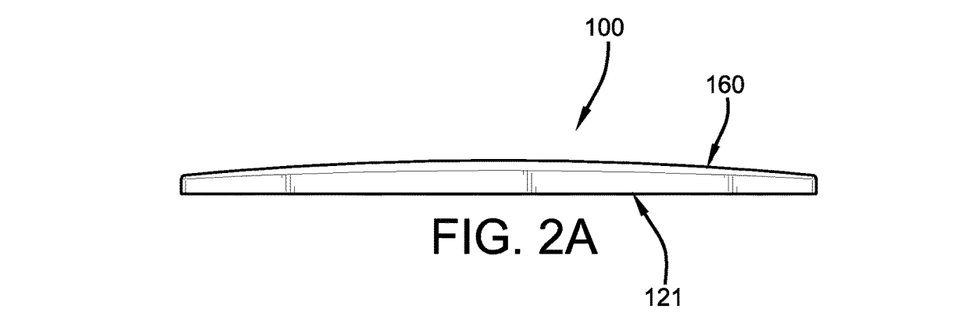
FIG. 2A is a side elevational view of the first exemplary embodiment micro RFID tag, according to the subject disclosure.
Figure 2B:
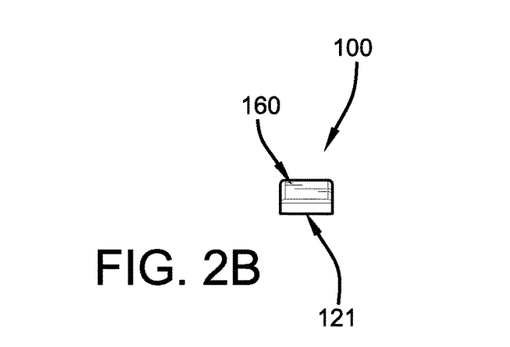
FIG. 2B is an end elevational view of the first exemplary embodiment micro RFID tag, according to the subject disclosure.
Figure 2C:
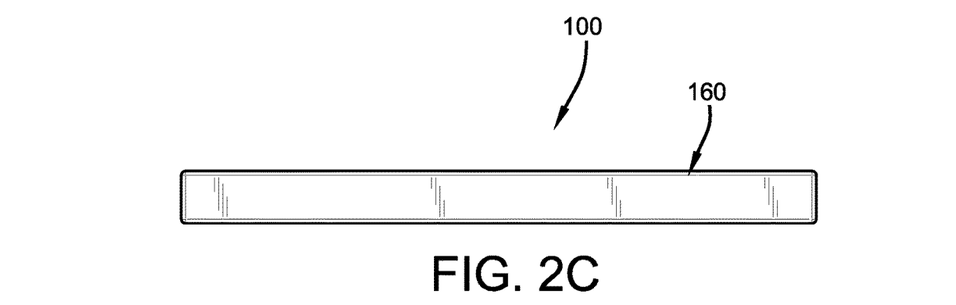
FIG. 2C is a top plan view of the first exemplary embodiment micro RFID tag, according to the subject disclosure.

An article 170, such as a surgical instrument, is illustrated in FIG. 1 with a first exemplary embodiment micro RFID tag 100, according to the subject disclosure, mounted thereon. First exemplary embodiment micro RFID tag 100 includes a substrate assembly 110 (FIGS. 3-5) and an encapsulation layer 160 (FIG. 8) partially or wholly surrounding the substrate assembly. Substrate assembly 110 has a non-conductive support substrate 112 formed from any suitable material, such as fiberglass or other glass epoxy, as is known. Substrate 112 is a single-layer construction and may have a flat printed circuit board ("PCB") configuration with a longitudinal central axis A. Alternatively, substrate 112 may have a multi-layer construction formed from a suitable process, such that substrate 112 may have multiple integrated circuits and interconnections spanning multiple layers. Substrate 112 generally includes an upper surface 120; elongated, parallel, spaced-apart opposing side edges 114, 116; opposing ends 118; and a flat bottom or engagement surface 121. The engagement surface 121 operatively retains a conductive coating or antenna 121A over at least a portion of the engagement surface. Antenna 121A is formed by any suitable process from any suitable material, such as metallic foil or conductive ink. Upper surface 120 generally includes a pair of conductive trace interconnects 122, 124, anchors 126, 127, 128, and communication bores 130, 132.

Figures 3, 4:
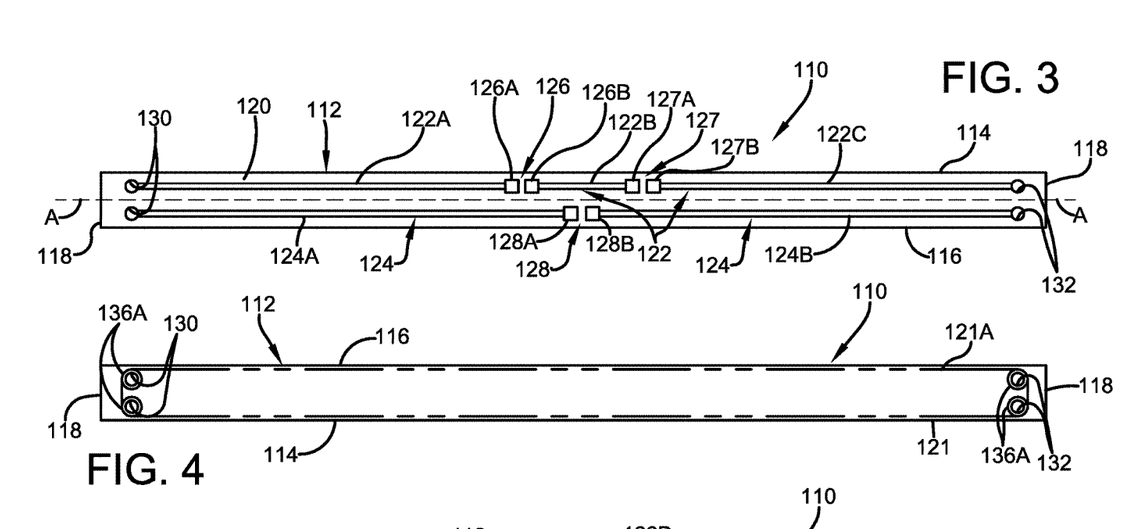
FIG. 3 is a top plan view of a substrate assembly of the first exemplary embodiment micro RFID tag, according to the subject disclosure, prior to being mounted with the integrated components.
FIG. 4 is a bottom plan view of the substrate assembly, shown in FIG. 3, showing a conductive layer and communication bores.
Figure 5:
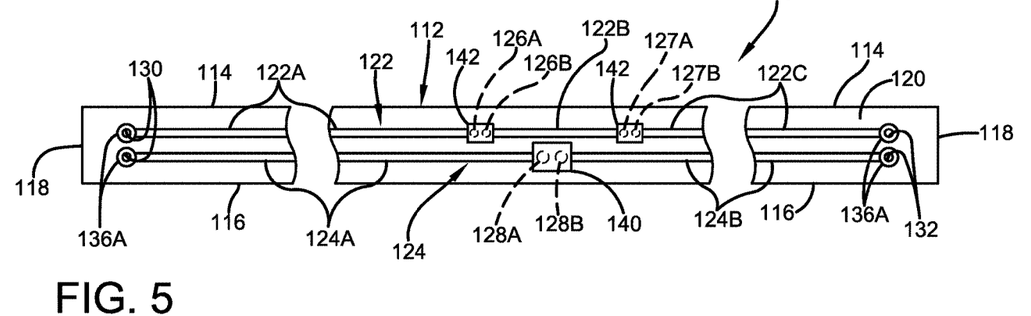
FIG. 5 is an enlarged fragmentary top plan view of portions of the substrate assembly, shown in FIG. 3, with the integrated components attached.

With continued reference to FIGS. 3-5, anchors 126, 127, 128 include individual component solder attachment pads 126A and 126B, 127A and 127B, 128A and 128B, respectively. Each of the attachment pads 126A, 126B, 127A, 127B, 128A, 128B may be formed using any suitable process from any suitable material, such as metallic foil or conductive ink, as is known, which allows for the use of solder material to attach components to the attachment pads. Anchors 126, 127, 128 may be arranged on upper surface 120 in any suitable manner allowing for the attachment or mounting of any suitable components. More preferably, anchors 126, 127 are spaced apart and operatively retained on upper surface 120 along conductive trace interconnect 122 between longitudinal central axis A and edge 114. Anchor 128 is operatively retained on upper surface 120 along conductive trace interconnect 124 between longitudinal central axis A and edge 116. Anchor 128 is generally symmetrically aligned and equidistant from anchors 126, 127. Anchor 128 may have an RFID assembly or encoded chip 140 attached by any suitable means to provide electrical conduction between the attachment point and the RFID encoded chip. RFID encoded chip 140 may be of any suitable size and include an integrated or discrete memory means or device, such as flash memory, to store data, such as a unique identification number, as is known. RFID encoded chip 140 may also include an integrated transmitter for broadcasting the data stored in any integrated or discrete memory means or device, as is known. As a result, RFID encoded chip 140 may overlie portions of trace interconnects 122, 124 without contacting the interconnects. Anchors 126, 127 may have dedicated antenna-enabled capacitors 142 similarly attached by any suitable electrically conductive means. Alternatively, other components, such as discrete memory means or devices, separate power sources, and the like, may be attached to any number of other anchors on either upper surface 120 or engagement surface 121. It should be understood that RFID encoded chip 140 could be an SMT Packaged Chip, without changing the overall concept or operation of the subject disclosure.

Trace interconnects 122, 124 are generally formed using any suitable process from any suitable material, such as metallic foil, conductive ink, wire, or the like, and extend in spaced parallel relation to one another. Trace interconnect 122 is formed from one or more segments 122A, 122 B, 122C, preferably in symmetric spaced relationship with anchor 128, trace interconnect 124, and bores 130,132. Similarly, trace interconnect 124 is formed from a pair of segments 124A, 124B. Trace interconnect segments 122A, 122C overlie and extend from communication bores 130, 132, respectively, and terminate into attachment pads 126A, 127B, respectively, of anchors 126, 127. Trace interconnect segment 122B extends between and terminates into attachment pads 126B, 127A. As a result, trace interconnect 122 is operatively connected to and bridges between capacitors 142. Trace interconnect segments 124A, 124B overlie and extend from communication bores 130, 132, respectively, and terminate into attachment pads 128A, 128B, respectively, of anchor 128. As a result, trace interconnect 124 is operatively connected to RFID encoded chip 140.

Communication bores 130, 132 are each arranged proximate to a respective opposite end 118 of substrate 112. Communication bores 130, 132 may each form a pair of openings on upper surface 120 and extend through substrate 112 to engagement surface 121. Alternatively, communication bores 130, 132 may form any number of openings or other conductive means, such as wires, a rivet, a plated opening or opening filled with conductive ink, or the like, which may extend partially or completely through substrate 112. Conductive communication sleeves 136 (FIG. 9) line or extend through each of communication bore 130, 132. Sleeves 136 may be formed using any suitable process from any suitable material, such as metallic foil, wire, plating, conductive fill, rivets, or the like, and include radially-outwardly extending flanges or engagement lips 136A at opposite ends of the sleeves. Engagement lips 136A of each sleeve 136 operatively contact or engage trace interconnects 122, 124 and antenna 121A. More particularly, sleeves 136 provide a conductive communication bridge from trace interconnect 122 to antenna 121A and to trace interconnect 124, creating a conductive bridge between RFID encoded chip 140, capacitors 142, and antenna 121A. Preferably, the structural components are arranged with symmetrical balance. As a result, capacitors 142 provide an increased and uniformly balanced charge to RFID encoded chip 140, increasing the output power of the transmitter of the RFID encoded chip, thereby increasing the read range of micro RFID tag 100.

Figure 6:
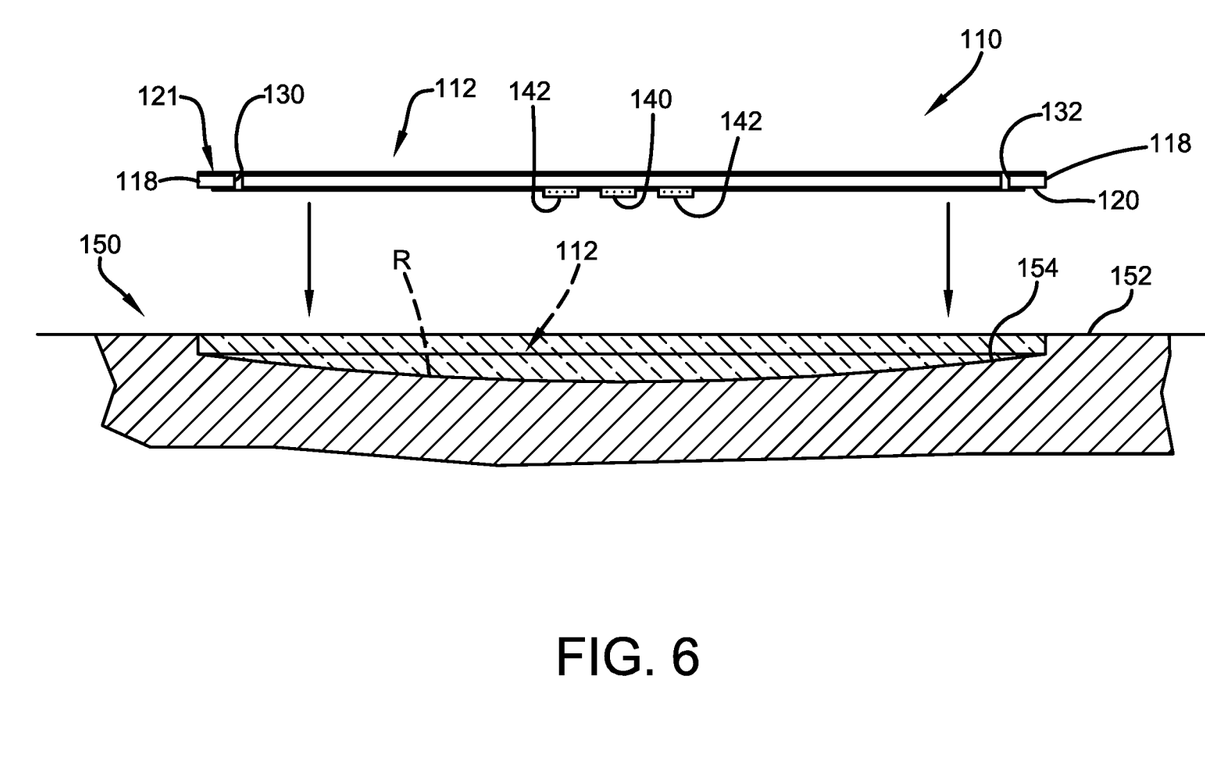
FIG. 6 is an elevational view in section of the substrate assembly of the first exemplary embodiment micro RFID tag, according to the subject disclosure, positioned for insertion into an encapsulation process mold.
Figure 7:
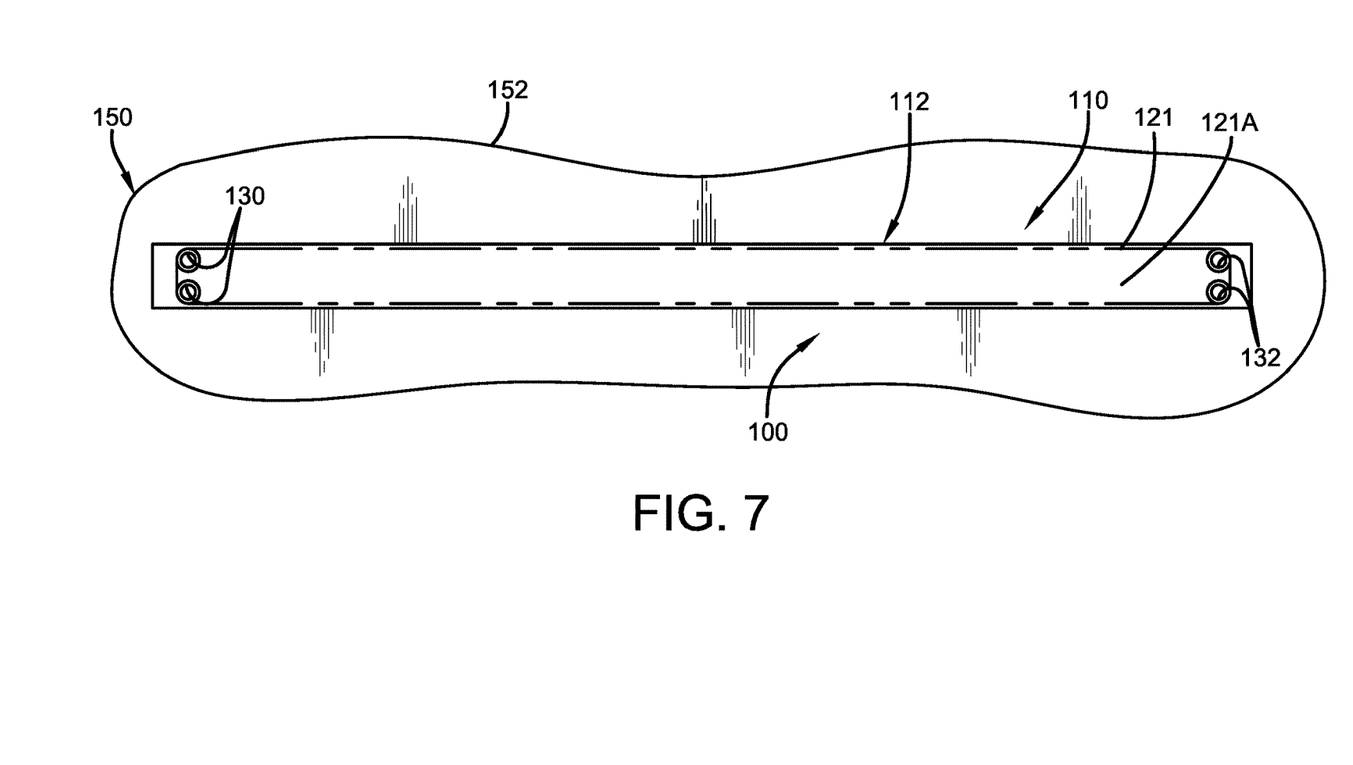
FIG. 7 is a bottom plan view of the substrate assembly, shown in FIG. 6, disposed within the encapsulation process mold.

Turning now to FIGS. 6-7, encapsulation layer 160 may be formed by any suitable method or technique using any suitable material capable of withstanding extreme temperature and pressure. In particular, encapsulation layer 160 may be formed using a material molding process. A mold 150 has an upper surface 152. Upper surface 152 has a contoured, elongated recess or receiving channel 154 adapted to be filled with an encapsulation material R, such as an epoxy, for example EpoxAcast™ 670 HT (Smooth-On, Inc.), or other suitable resin. Encapsulation material R may include specialized components or additives that provide or enhance specific physical or mechanical properties of the material. In particular, encapsulation material R may include an additive to increase the flexibility of the cured material, such as Flexer® Epoxy Flexibilizer (Smooth-On, Inc.). As a result, once cured, encapsulation material R may have reduced hardness, providing flexibility to conform to article 170 and preventing damage to encapsulation layer 160 or substrate assembly 110 from impacts. Encapsulation material R, once cured may have a Shore hardness in the range of from about 45 D to about 110 D, and more preferably from about 70 D to about 85 D. In addition, encapsulation material R, when cured, may be capable of withstanding extreme temperatures, such as those that first exemplary embodiment micro RFID tag 100 may be exposed to in industrial and/or medical processes, use, and maintenance. Encapsulation material R may be capable of withstanding temperatures in the range of from about −58° F. to about 425° F. More preferably, encapsulation material R may have a high temperature tolerance above 302° F., or the temperature commonly used in sterilization or cleaning processes, such as autoclaving. Substrate assembly 110 may be inverted and disposed within encapsulation material R to submerge all or a portion of the substrate assembly, including upper surface 120; edges 114, 116; and ends 118. Once encapsulation material R is cured or set, the first exemplary embodiment micro RFID tag 100 may be removed from mold 150 and mounted on article 170 for use.

Alternatively, encapsulation layer 160 may be formed about substrate assembly 110 using an injection molding process. Generally, a plurality of substrate assemblies 110 may be placed in an appropriately shaped block or mold (not shown). The block may then have any suitable injectable polymer or material, such as Grilamid (EMS-Grivory), pushed into the block or mold. The injectable material may have slightly different properties from encapsulation material R described above. In particular, the injectable material may have a greater preferred Shore hardness in the range of from about 65 D to about 85 D. The injectable material is allowed to cool and the block is opened to release the encapsulated first exemplary embodiment micro RFID tag 100, which may then be mounted on an article 170 for use.

Figure 8:
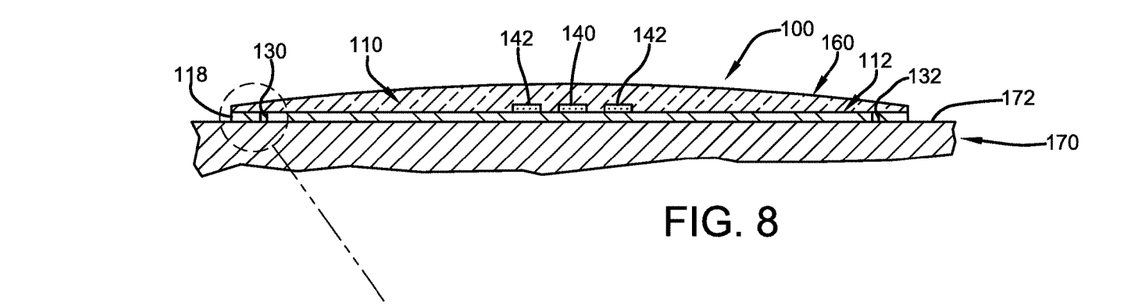
FIG. 8 is a cross-sectional view of the first exemplary embodiment micro RFID tag, according to the subject disclosure, mounted on the article.
Figure 9:
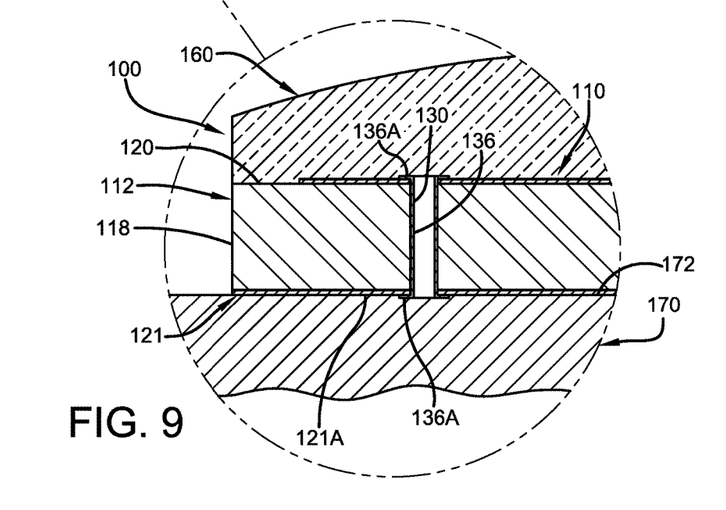
FIG. 9 is an enlarged cross-sectional view of a portion of the first exemplary embodiment micro RFID tag, shown in FIG. 8, showing a conductive bridge through a bore between the substrate surfaces for contact between the substrate assembly and the article.

In accordance with an important aspect of the subject disclosure, antenna 121A on engagement surface 121 also acts as a conductive layer to provide electrically conductive communication between substrate assembly 110 and article 170, as shown in FIGS. 8-9. In particular, micro RFID tag 100 is generally fixedly mounted on article 170 in order to identify and track the article through various industrial and/or medical processes, use, and maintenance. First exemplary embodiment micro RFID tag 100 is mounted on article 170 using any suitable mechanical or chemical methods and materials, such as conductive adhesive, capable of ensuring a strong bond resistant to extreme conditions and chemical exposure as well as providing conductive communication between the article and antenna 121A. Upon mounting of first exemplary embodiment micro RFID tag 100, engagement surface 121 of substrate 112 contacts article 170 or may be separated by a thin layer of adhesive, encapsulation material R, or the like. More particularly, antenna 121A may be in intimate contact with metallic surface 172 of article 170. As a result, a conductive bridge is formed between capacitors 142, RFID encoded chip 140, interconnects 122, 124, and article 170. The resulting conductive bridge effectively extends the length of the antenna 121A, allowing first exemplary embodiment micro RFID tag 100 to have increased signal gain, thereby increasing the read range of the micro RFID tag.

Thus the improved first exemplary embodiment micro RFID tag 100 of the subject disclosure provides substrate assembly 110 with capacitors 142 and trace interconnects 122, 124 to increase power output of RFID encoded chip 140, extends the effective length of antenna 121A by providing an interface with the conductive article and provides protection from impacts, chemicals, and extreme temperatures via encapsulation layer 160. As a result, the overall elongated shape, size, and weight of first exemplary embodiment micro RFID tag 100 of the subject disclosure is optimized and reduced or maintained, yet allows for increased read range and easier mounting on article 170 without obstructing the normal operation of the article.

Figure 10:
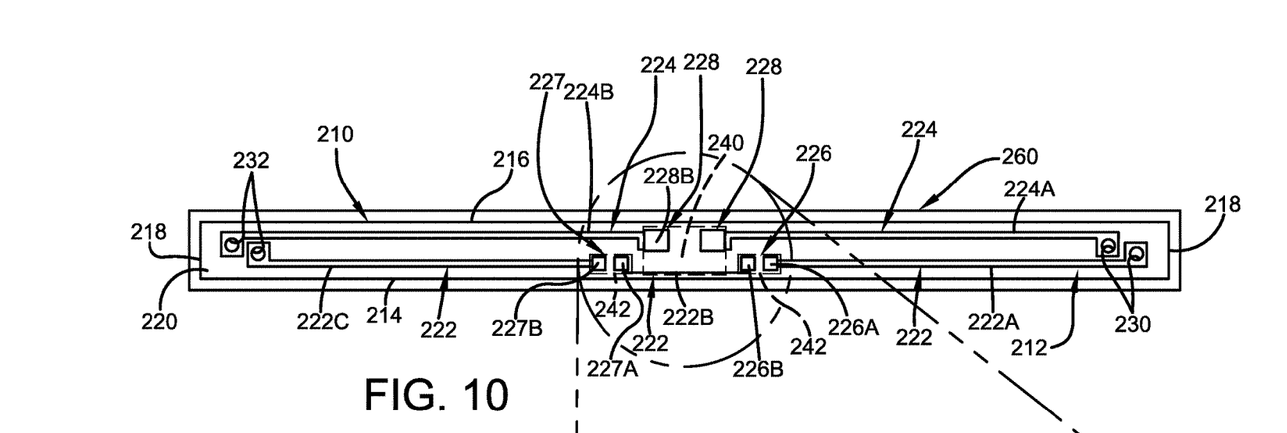
FIG. 10 is a top plan view of a second exemplary embodiment of an elongated micro RFID tag, according to another aspect of the subject disclosure.
Figure 10A:
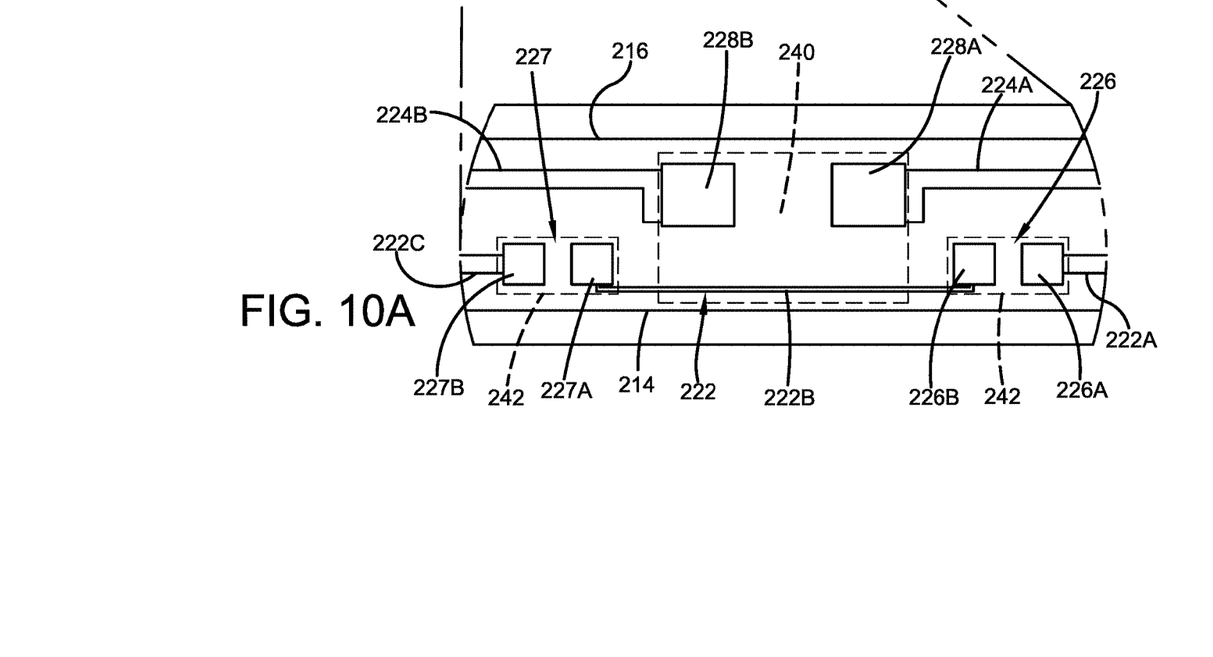
FIG. 10A is a greatly enlarged view of a portion of the second exemplary embodiment micro RFID tag, shown in FIG. 10, showing the trace interconnect segments situated generally below the RFID assembly.
Figure 11:
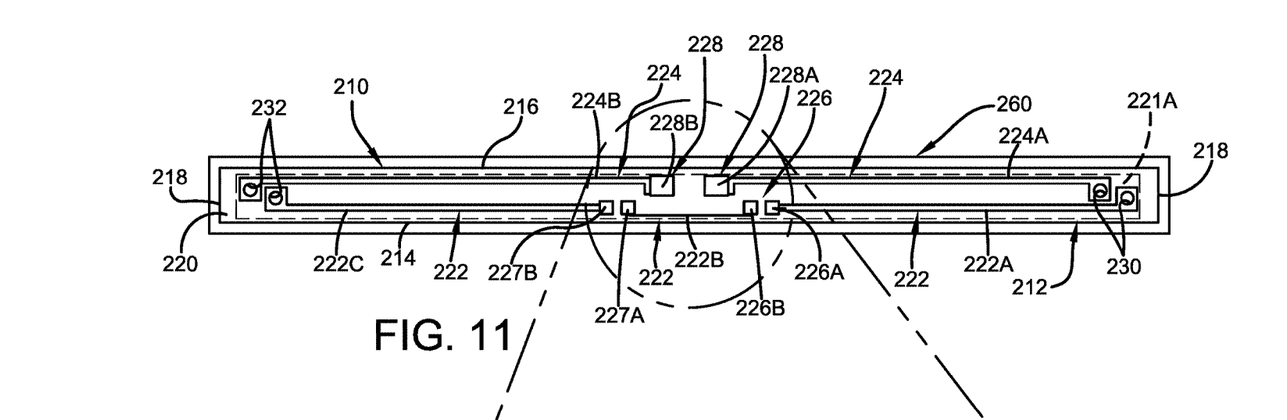
FIG. 11 is a top plan view of the second exemplary embodiment micro-RFID tag shown in FIG. 10, showing the RFID assembly and capacitors removed.
Figure 11A:
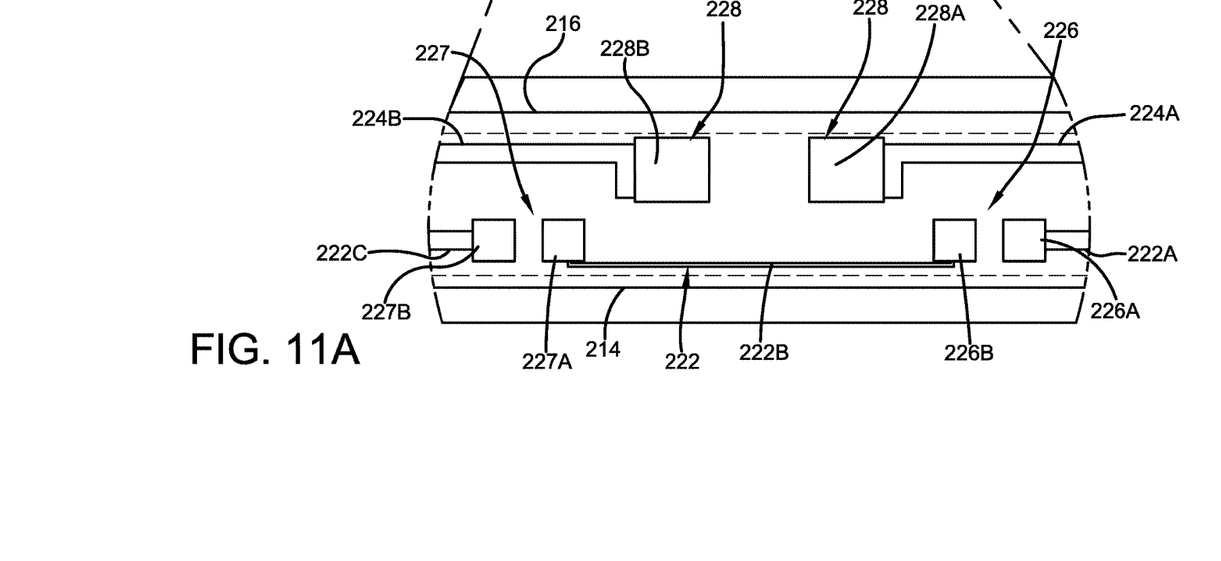
FIG. 11A is a greatly enlarged view of a portion of the second exemplary embodiment micro RFID tag, shown in FIG. 11.

Turning now to FIGS. 10-11A, a second exemplary embodiment micro RFID tag 200 according to another aspect of the subject disclosure is shown. Second exemplary embodiment micro RFID tag 200 is similar to first exemplary embodiment micro RFID tag 100 in construction and arrangement. As a result, the description below will be primarily directed to the differences between first exemplary embodiment micro RFID tag 100 and second exemplary embodiment micro RFID tag 200.

Second exemplary embodiment micro RFID tag 200 includes a substrate assembly 210 and an encapsulation layer 260 partially or wholly surrounding the substrate assembly. Substrate assembly 210 has a non-conductive support substrate 212 formed as a single layer construction including an upper surface 220; elongated, parallel, spaced-apart opposing side edges 214, 216; opposing ends 218; a flat bottom or engagement surface (not shown), and a longitudinal central axis A'. The engagement surface operatively retains a conductive coating or antenna 221A over at least a portion of the engagement surface. Upper surface 220 generally includes a pair of conductive trace interconnects 222, 224, anchors 226, 227, 228, and communication bores 230, 232.

Anchors 226, 227, 228 include individual component solder attachment pads 226A, 226B, 227A, 227B, 228A, 228B, respectively. Anchors 226, 227, 228 may be arranged on upper surface 220 in any suitable manner allowing for the attachment or mounting of any suitable components. More preferably, anchors 226, 227 are spaced apart and operatively retained on upper surface 220 between longitudinal central axis A' and edge 214. Anchor 228 is operatively retained on upper surface 220 partially overlaying longitudinal central axis A' adjacent edge 216. Anchors 226, 227 are generally equidistant from anchor 228, preferably in symmetric spaced relationship with anchor 228, trace interconnect 224, and bores 230, 232. Anchor 228 may have an RFID assembly or encoded chip 240 attached by any suitable means to provide electrical conduction between the attachment point and the RFID assembly. RFID assembly 240 may be of any suitable size and include an integrated or discrete memory means or device, such as flash memory, to store data, such as a unique identification number, as is known. RFID assembly 240 may also include an integrated transmitter for broadcasting the data stored in any integrated or discrete memory means or device. RFID assembly 240 generally extends over longitudinal central axis A' and is adjacent to edge 214 and edge 216, nearly occupying the entire width of substrate 212. Anchors 226, 227 may have dedicated antenna-enabled capacitors 242 similarly attached by any suitable electrically conductive means and disposed in a manner preventing contact with RFID assembly 240. Alternatively, other components, such as discrete memory means or devices, separate power sources, and the like, may be attached to any number of other anchors on either upper surface 220 or the engagement surface (not shown).

Trace interconnects 222, 224 are generally formed from an appropriate material, such as metallic foil, conductive ink, or wire, and extend in spaced parallel relation to one another. Trace interconnect 222 is formed from one or more segments 222A, 222B, 222C. Similarly, trace interconnect 224 is formed from a pair of segments 224A, 224B. Trace interconnect segments 222A, 222C overlie and extend from communication bores 230, 232, respectively, and terminate into attachment pads 226A, 227B, respectively, of anchors 226, 227. Trace interconnect segment 222B extends between and terminates into attachment pads 226B, 227A. More particularly, trace interconnect segment 222B may be partially or wholly retained on edge 214 to prevent RFID assembly 240 from contacting the segment. As a result, trace interconnect 222 is operatively connected to and bridges between capacitors 242. Trace interconnect segments 224A, 224B overlie and extend from communication bores 230, 232, respectively, and terminate into attachment pads 228A, B, respectively, of anchor 228. As a result, trace interconnect 224 is operatively connected to RFID assembly 240.

Thus the improved second exemplary embodiment micro RFID tag 200 of the subject disclosure provides substrate assembly 210 with capacitors 242 and interconnects 222, 224 to increase power output of RFID assembly 240, extends the effective length of antenna 221A by providing an interface with the conductive article, and provides protection from impacts, chemicals, and extreme temperatures via encapsulation layer 260. As a result, the overall elongated shape, size, and weight of second exemplary embodiment micro RFID tag 200 of the subject disclosure is optimized and reduced or maintained, allowing for increased read range and easier mounting on an article (not shown) without obstructing the normal operation of the article.

It should be understood that alternate configurations of first and second exemplary embodiment micro RFID tags 100, 200 of the subject disclosure could be utilized without changing the overall concept or operation of the subject disclosure. It should also be understood that other types of capacitors and RFID encoded chips and assemblies could be utilized without changing the overall concept or operation of the subject disclosure. It should be understood that first and second exemplary embodiment micro RFID tags 100, 200 of the subject disclosure could be encapsulated with any material having the preferred range of temperature and hardness characteristics, without changing the overall concept or operation of the subject disclosure. It is understood that first and second exemplary embodiment micro RFID tags 100, 200 of the subject disclosure could have other shapes, sizes, bore placements, and circuit designs, preferably in a symmetrical spaced relationship, without changing the overall concept or operation of the subject disclosure.

Accordingly, first and second exemplary embodiment micro RFID tags 100, 200 of the subject disclosure are simplified, provide an effective, safe, inexpensive, and efficient structure and method which achieve all the enumerated objectives, provide for eliminating difficulties encountered with prior art micro RFID tags, and solve problems and obtain new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which first and second exemplary embodiment micro RFID tags 100, 200 are used and installed, the characteristics of the construction, arrangement and method steps, and the advantageous, new and useful results obtained; the new, unique, and useful structures, devices, elements, shapes, arrangements, process, parts and combinations are set forth in the appended claims.

What is claimed is:

1. A micro radio frequency identification tag for use on an article in an equipment identification and tracking system, the micro radio frequency identification tag comprising:
    a substrate having a first surface and a second surface, each one of said surfaces including a width, and a longitudinal length, said longitudinal length being greater than said width;
    an RFID chip operatively retained on the first surface by an anchor;
    a power storage means, comprising at least a pair of capacitors operatively retained on the first surface, said capacitors symmetrically spaced from said RFID chip;
    an antenna operatively retained on the second surface and extending along said longitudinal length of said second surface, the antenna also acting as a communication layer; and
    a conductive means extending between the first surface and the second surface to operatively connect the antenna to the RFID chip and the power storage means.

2. The micro radio frequency identification tag of claim 1, further comprising an encapsulation layer.

3. The micro radio frequency identification tag of claim 2, the encapsulation layer comprising an injection moldable polycarbonate.

4. The micro radio frequency identification tag of claim 2, the micro radio frequency identification tag being one or a plurality of micro radio frequency identification tags disposed about a reel dispenser.

5. The micro radio frequency identification tag of claim 2, the encapsulation layer encompassing the RFID chip, the power storage means, the antenna, and the first surface of the substrate.

6. The micro radio frequency identification tag of claim 5, the encapsulation layer including an additive for flexibility.

7. The micro radio frequency identification tag of claim 6, the encapsulation layer having a Shore hardness in the range from about 45 D to about 110 D.

8. The micro radio frequency identification tag of claim 5, the encapsulation layer comprising a chemical resistant polymer or composite.

9. The micro radio frequency identification tag of claim 5, the encapsulation layer comprising a polymer or composite capable of withstanding temperatures in the range of about −58° F. to about 425° F.

10. The micro radio frequency identification tag of claim 5, the encapsulation layer comprising a polymer or composite capable of withstanding gaseous sterilization.

11. The micro radio frequency identification tag of claim 1, the RFID chip further comprising an assembly including distinct memory means.

12. The micro radio frequency identification tag of claim 1, the conductive means further comprising a conductive foil sleeve extending through an opening of the substrate and operatively connected between the antenna and at least one interconnect conductively connecting the RFID chip and the power storage means.

13. The micro radio frequency identification tag of claim 1, the micro radio frequency identification tag being operatively mounted on the article;

wherein the antenna acting as the conductive layer operatively contacts the article enabling electrical conductance between the article and the micro radio frequency identification tag.

14. The micro radio frequency identification tag of claim 13, the article further comprising a medical instrument.

15. The micro radio frequency identification tag of claim 14, wherein the micro radio frequency identification tag is mounted on the medical instrument in a position not affecting the structure or function of the medical instrument.

16. The micro radio frequency identification tag of claim 14, the medical instrument being one of a plurality of instruments comprising a surgical kit;
   wherein the surgical kit has a different micro radio frequency identification tag mounted thereon.

17. The micro radio frequency identification tag of claim 1, wherein the RFID chip is capable of being induced by a radio frequency field generator from a distance of about 5 feet to about 7 feet.

18. A method of utilizing a micro radio frequency identification tag with an article in an equipment identification and tracking system, comprising the method steps of:

1) providing an RFID tag, said RFID tag including a substrate having a first surface and a second surface, each one of said surfaces including a width and a longitudinal length, said longitudinal length being greater than said width; an RFID chip operatively retained on the first surface by an anchor; a power storage means comprising at least a pair of capacitors operatively retained on the first surface, said capacitors symmetrically spaced from said RFID chip; an antenna operatively retained on the second surface and extending along said longitudinal length of said second surface, the antenna also acting as a communication layer; and a conductive means extending between the first surface and the second surface to operatively connect the antenna to the RFID chip and the power storage means, 2) encapsulating at least a portion of said RFID tag with an encapsulant, 3) adhering the non-encapsulated conductive layer of the RFID tag to an article to be identified and tracked.

\* \* \* \* \*